(12) United States Patent
Masuda

(10) Patent No.: US 10,457,157 B2
(45) Date of Patent: Oct. 29, 2019

(54) MOTOR DRIVE DEVICE

(71) Applicant: NTN CORPORATION, Osaka (JP)

(72) Inventor: Yui Masuda, Iwata (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/067,034

(22) PCT Filed: Jan. 5, 2017

(86) PCT No.: PCT/JP2017/000096
§ 371 (c)(1),
(2) Date: Jun. 28, 2018

(87) PCT Pub. No.: WO2017/119432
PCT Pub. Date: Jul. 13, 2017

(65) Prior Publication Data
US 2019/0001839 A1    Jan. 3, 2019

(30) Foreign Application Priority Data

Jan. 7, 2016  (JP) ................... 2016-001504

(51) Int. Cl.
*B60L 15/20* (2006.01)
*H02P 23/04* (2006.01)
(Continued)

(52) U.S. Cl.
CPC ............... *B60L 15/20* (2013.01); *H02P 6/10* (2013.01); *H02P 23/04* (2013.01); *H02P 29/40* (2016.02);
(Continued)

(58) Field of Classification Search
CPC ...... H02P 1/00; H02P 1/04; H02P 1/24; H02P 1/26; H02P 1/265; H02P 1/30; H02P 1/42;
(Continued)

(56) References Cited

U.S. PATENT DOCUMENTS 8,682,546 B2 * 3/2014 Otsuka .................. F02D 11/105
 123/192.1
9,018,870 B2   4/2015 Kobayashi et al.
(Continued)

FOREIGN PATENT DOCUMENTS

DE   11 2012 000 320 T5   9/2013
JP      2000-217209        8/2000
(Continued)

OTHER PUBLICATIONS

English Translation by WIPO of the International Preliminary Report on Patentability dated Jul. 19, 2018 in corresponding International Patent Application No. PCT/JP2017/000096, 6 pgs.
(Continued)

*Primary Examiner* — Antony M Paul

(57) ABSTRACT

The motor drive device includes: an electric motor (6); a controller (1) that controls a torque of the electric motor (6) or a quantity of state corresponding to the torque; and a torque transmitter that transmits the torque of the electric motor (6) to a wheel of a vehicle. The controller (1) includes a torque fluctuation inhibiting section (15) that inhibits torque fluctuation in the electric motor (6). The torque fluctuation inhibiting section (15) includes an execution determination section (15b) that determines whether or not to inhibit the torque fluctuation in the electric motor (6), based on a result of comparison between an estimated value of a torque fluctuation frequency in the electric motor (6), and one or both of transmission characteristics of the torque transmitter and vibration characteristics in the vehicle.

5 Claims, 7 Drawing Sheets

(51) Int. Cl.
*H02P 29/40* (2016.01)
*H02P 6/10* (2006.01)

(52) U.S. Cl.
CPC ........ *B60L 2240/423* (2013.01); *Y02T 10/644* (2013.01); *Y02T 10/7275* (2013.01)

(58) Field of Classification Search
CPC .. H02P 1/423; H02P 1/46; H02P 1/465; H02P 1/54; H02P 3/00; H02P 3/04; H02P 3/06; H02P 4/00; H02P 5/00; H02P 5/52; H02P 5/69; H02P 5/695; H02P 5/753; H02P 6/00; H02P 6/001; H02P 6/002; H02P 6/005; H02P 6/007; H02P 6/008; H02P 6/10; H02P 6/12; H02P 6/183; H02P 8/18; H02P 8/42; H02P 9/00; H02P 21/00; H02P 21/0017; H02P 21/0035; H02P 21/005; H02P 23/00; H02P 23/004; H02P 23/08; H02P 25/088; H02P 27/00; H02P 27/04; H02P 27/06; H02P 27/02; H02P 2007/052
USPC ............ 318/400.01, 400.02, 400.14, 400.21, 318/400.22, 700, 701, 727, 779, 799, 800, 318/801, 430, 432, 400.23
See application file for complete search history.

(56) References Cited

U.S. PATENT DOCUMENTS

| | | |
|---|---|---|
| 9,787,230 B2 | 10/2017 | Nakajima et al. |
| 9,855,857 B2 | 1/2018 | Klymenko et al. |
| 2002/0190683 A1 | 12/2002 | Karikomi et al. |
| 2012/0330485 A1 | 12/2012 | Tamagawa |
| 2013/0307449 A1 | 11/2013 | Kobayashi et al. |
| 2014/0257617 A1 | 9/2014 | Klymenko et al. |
| 2015/0333670 A1 | 11/2015 | Nakajima et al. |

FOREIGN PATENT DOCUMENTS

| | | |
|---|---|---|
| JP | 2007-267466 | 10/2007 |
| JP | 2009-106069 | 5/2009 |
| JP | 2012-217284 | 11/2012 |
| JP | 2014-150604 | 8/2014 |
| WO | WO 2013/053547 A1 | 4/2013 |

OTHER PUBLICATIONS

International Search Report dated Mar. 14, 2017 in corresponding International Patent Application No. PCT/JP2017/000096.
Extended European Search Report dated Aug. 9, 2019 in corresponding European application No. 17735969.2.

\* cited by examiner

DEGREE OF EXECUTION OF TORQUE FLUCTUATION INHIBITION

MOTOR DRIVE DEVICE

CROSS REFERENCE TO THE RELATED APPLICATIONS

This application is a National Phase Application under 35 U.S.C. § 371 of PCT International Patent Application No. PCT/JP2017/000096, filed Jan. 5, 2017, which claims Convention priority to Japanese patent application No. 2016-001504, filed Jan. 7, 2016, the entire disclosures of which are herein incorporated by reference as a part of this application.

BACKGROUND OF THE INVENTION

Field of the Invention

The present invention relates to a motor drive device that drives a vehicle.

Description of Related Art

A vehicle to which a motor is applied as a drive source for running has been put to practical use. The following technologies have been proposed for reducing torque ripple (torque fluctuation) of the motor.
1. A method for reducing torque fluctuation by inputting a torque command value whose phase is opposite to that of the torque fluctuation (Patent Document 1).
2. A method for reducing torque fluctuation by superimposing a torque fluctuation compensation current on a q-axis current (Patent Document 2).
3. A torque fluctuation compensation method based on an error between a model and an actual device (Patent Document 3).

RELATED DOCUMENT

Patent Document

[Patent Document 1] JP Laid-open Patent Publication No. 2014-150604
[Patent Document 2] JP Laid-open Patent Publication No. 2007-267466
[Patent Document 3] JP Laid-open Patent Publication No. 2000-217209

In an electric motor as disclosed in any of Patent Documents 1 to 3 and in a vehicle driven by these electric motor, torque fluctuation of the electric motor may cause vibration of the vehicle and deteriorate riding comfort. Generally, it is considered that an IPM synchronous motor that uses a magnetic torque and a reluctance torque in combination to realize great torque and higher output is suitable as an electric motor for driving a vehicle. However, the IPM synchronous motor has a possibility that torque ripple is relatively high.

Meanwhile, a motor having small torque fluctuation has to reduce the torque density in many cases. For example, in the case where torque fluctuation is reduced by skew or nonconcentric shape of a magnetic pole, the magnetic pole generally has a complicated shape and, at the same time, effective magnetic flux rate that contributes to the torque is reduced. In this case, maintaining the torque may cause cost increase, motor-size increase, and weight increase, etc.

In the case where torque fluctuation is reduced by multipolarization, the multipolarization may cause an increase in electrical angular velocity per motor angular velocity, which may lead to a reduction in the maximum rotation speed (or the number of rotation per unit time) or a reduction in efficiency during high-speed rotation. Further, a motor with less torque fluctuation, such as an induction motor, has lower torque density than a BLDC motor or the like, and may have lower mountability to a vehicle, due to size increase, weight increase, or the like.

For example, a technology for inhibiting torque fluctuation by superimposing a current waveform that generates a torque that cancels the torque fluctuation, as described in Patent Document 1, has been proposed. Further, a control in which a torque fluctuation component is extracted by an observer or the like and canceled, as described in Patent Documents 2 and 3, has been known. However, in the control for canceling the torque fluctuation, the current waveform for canceling the torque fluctuation may have a high-order frequency component, which may cause an increase in iron loss, leading to possibilities such as deteriorated fuel efficiency or power efficiency, and heat generation of the motor.

SUMMARY OF THE INVENTION

An object of the present invention is to provide a motor drive device capable of improving riding comfort of an occupant of a vehicle and improving power efficiency or the like, and capable of achieving cost reduction and space conservation.

Hereinafter, in order to facilitate the understanding, the present invention will be described with reference to the reference numerals used in embodiments for convenience sake.

A motor drive device according to the present invention includes: an electric motor 6; a controller 1 configured to control a torque of the electric motor 6, or a quantity of state corresponding to the torque; and a torque transmitter 3 configured to transmit the torque of the electric motor 6 to a wheel 2 of a vehicle. The controller 1 includes a torque fluctuation inhibiting section 15 configured to inhibit torque fluctuation in the electric motor 6. The torque fluctuation inhibiting section 15 includes an execution determination section 15b configured to determine whether or not to inhibit the torque fluctuation in the electric motor 6, based on a result of comparison between an estimated value of a torque fluctuation frequency in the electric motor 6, and one or both of transmission characteristics of the torque transmitter 3 and vibration characteristics in the vehicle.

The quantity of state corresponding to the torque is a target motor current, for example. In this configuration, the torque fluctuation inhibiting section 15 of the controller 1 can inhibit the torque fluctuation in the electric motor 6. The execution determination section 15b in the torque fluctuation inhibiting section 15 determines whether or not to inhibit the torque fluctuation in the electric motor 6, based on the result of comparison between the estimated value of the torque fluctuation frequency, and one or both of transmission characteristics and vibration characteristics.

In this configuration, for example, the torque fluctuation is inhibited at a torque fluctuation frequency in a low frequency region where the amplification factor of the transmission characteristics or the vibration characteristics is high, thereby improving noise, vibration, and harshness (NVH: Noise, Vibration and Harshness), and enhancing riding comfort. At a torque fluctuation frequency in a high frequency region where the amplification factor of the transmission characteristics or the vibration characteristics is low, negative inhibition of the torque fluctuation is executed or inhibition of the torque fluctuation is not executed. Thus, iron loss can be prevented from increasing. Since an increase in iron loss can be prevented, fuel efficiency and power efficiency of the vehicle can be enhanced, and heat generation in the electric motor 6 can be inhibited. Further, since the torque fluctuation that causes a problem in the behavior of the vehicle is compensated for by control, requirements in motor design are relaxed, thereby realizing cost reduction and space conservation.

The torque fluctuation inhibiting section 15 may include a torque fluctuation estimation section 15a configured to generate the estimated value of the torque fluctuation frequency, based on a relationship between an angular velocity of the electric motor 6 and a torque fluctuation cycle per a predetermined rotation angle in the electric motor 6. In this case, the estimated value of the torque fluctuation frequency can be generated simply and accurately. The predetermined rotation angle is obtained based on the result of one or both of a test and a simulation.

The execution determination section 15b may reduce an amount of operation to inhibit the torque fluctuation in the electric motor 6, with an increase in the absolute value of the angular velocity of the electric motor 6, under a condition that the absolute value of the angular velocity exceeds a predetermined value. This is because the influence of the torque fluctuation on the vehicle is decreased with an increase in the absolute value of the angular velocity of the electric motor 6. By reducing the amount of operation to inhibit the torque fluctuation, iron loss can be prevented from increasing. The predetermined value is obtained based on the result of one or both of a test and a simulation.

The angular velocity of the electric motor 6 at which the execution determination section 15b reduces the amount of operation to inhibit the torque fluctuation may be an electric motor angular velocity at which an amplification factor falls below a predetermined value, and the amplification factor may be an amplification factor of transmission characteristics of an output torque with respect to an input torque to the torque transmitter 3, in the estimated value of the torque fluctuation frequency or a quantity of state corresponding to the estimated value. With the electric motor angular velocity (or the torque fluctuation frequency) at which the amplification factor falls below the predetermined value, the influence on the transmission torque is attenuated even when the torque fluctuation is generated, and therefore, it is considered that the process of reducing the amount of operation by the execution determination section 15b is less likely to adversely affect the vehicle. The predetermined value is obtained based on the result of one or both of a test and a simulation.

The angular velocity of the electric motor 6 at which the execution determination section 15b reduces the amount of operation to inhibit the torque fluctuation may be an electric motor angular velocity at which an amplification factor falls below a predetermined value, and the amplification factor may be an amplification factor of vibration characteristics in the vehicle, in the estimated value of the torque fluctuation frequency or a quantity of state corresponding to the estimated value. With the electric motor angular velocity (or the torque fluctuation frequency) at which the amplification factor falls below the predetermined value, the influence on the transmission torque is attenuated even when the torque fluctuation is generated, and therefore, it is considered that the process of reducing the amount of operation for inhibiting the torque fluctuation by the execution determination section 15b is less likely to adversely affect the vehicle. The predetermined value is obtained based on the result of one or both of a test and a simulation.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

A motor drive device according to an embodiment of the present invention will be described with reference to FIGS.

Figure 1:
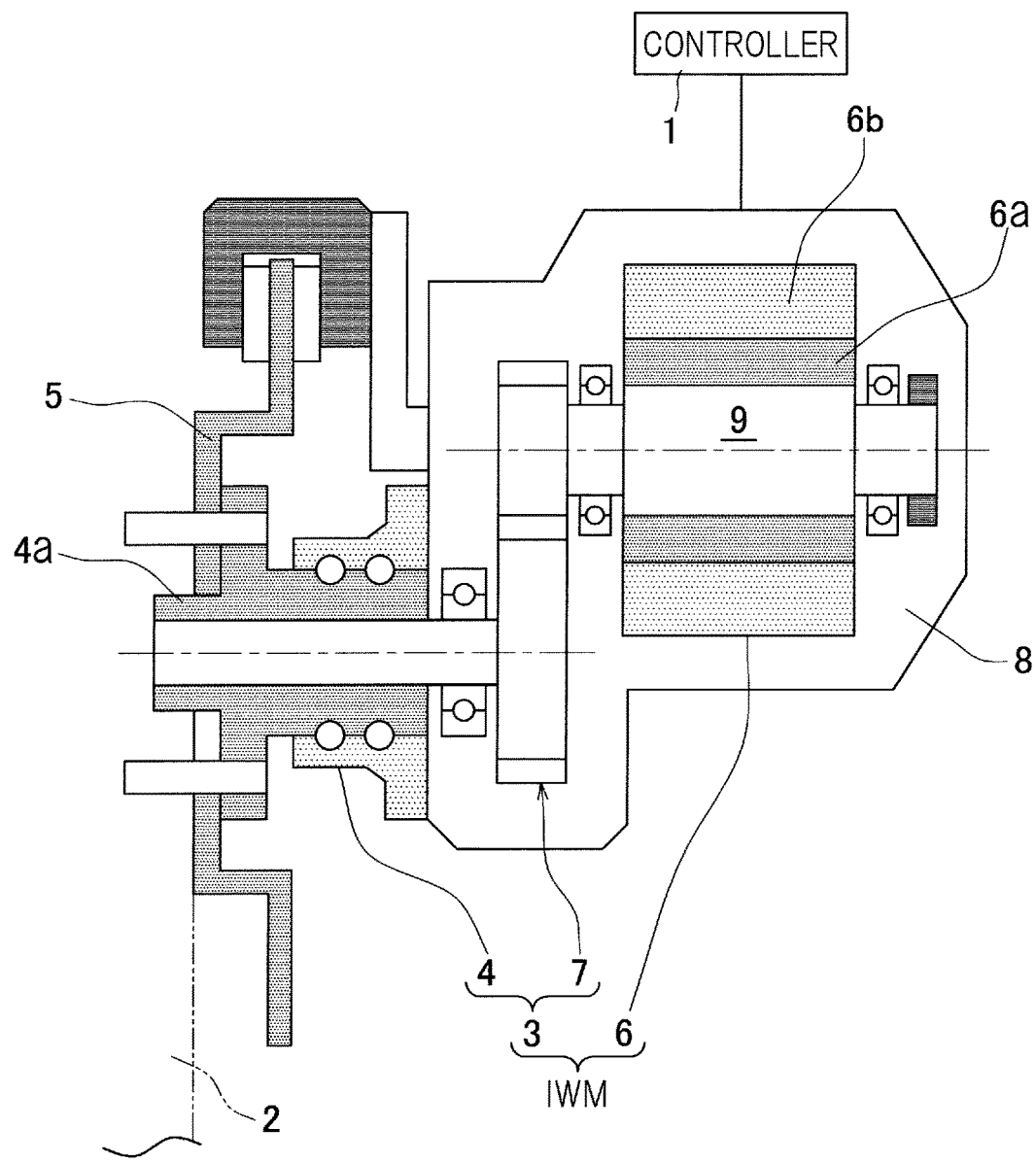
FIG. 1 is a longitudinal-sectional view schematically showing a motor drive device according to an embodiment of the present invention.

1 to 7. The motor drive device is a device for driving a vehicle. As shown in FIG. 1, the motor drive device of the present embodiment includes an electric motor 6, a controller 1, and a torque transmitter 3. The torque transmitter 3 includes a speed reducer (or reduction gear) 7 and a wheel bearing 4. The electric motor 6, the reducer 7, and the wheel bearing 4 provide an in-wheel motor drive device IWM which is partly or entirely disposed within a wheel.

The torque of the electric motor 6 is transmitted to a wheel 2 that is a drive wheel, via the reducer 7 and the wheel bearing 4. A brake rotor 5 as a component of a brake is formed at a flange of a hub ring 4a of the wheel bearing 4, and the brake rotor 5 rotates integrally with the wheel 2. As for the electric motor 6, in particular, an interior permanent magnet (IPM) synchronous motor using a reluctance torque and a magnetic torque in combination to achieve high output is preferably used. The electric motor 6 includes a stator 6b fixed to a housing 8 and a rotor 6a mounted to a rotational output shaft 9, with a radial gap provided between the stator 6b and the rotor 6a.

Figure 2:
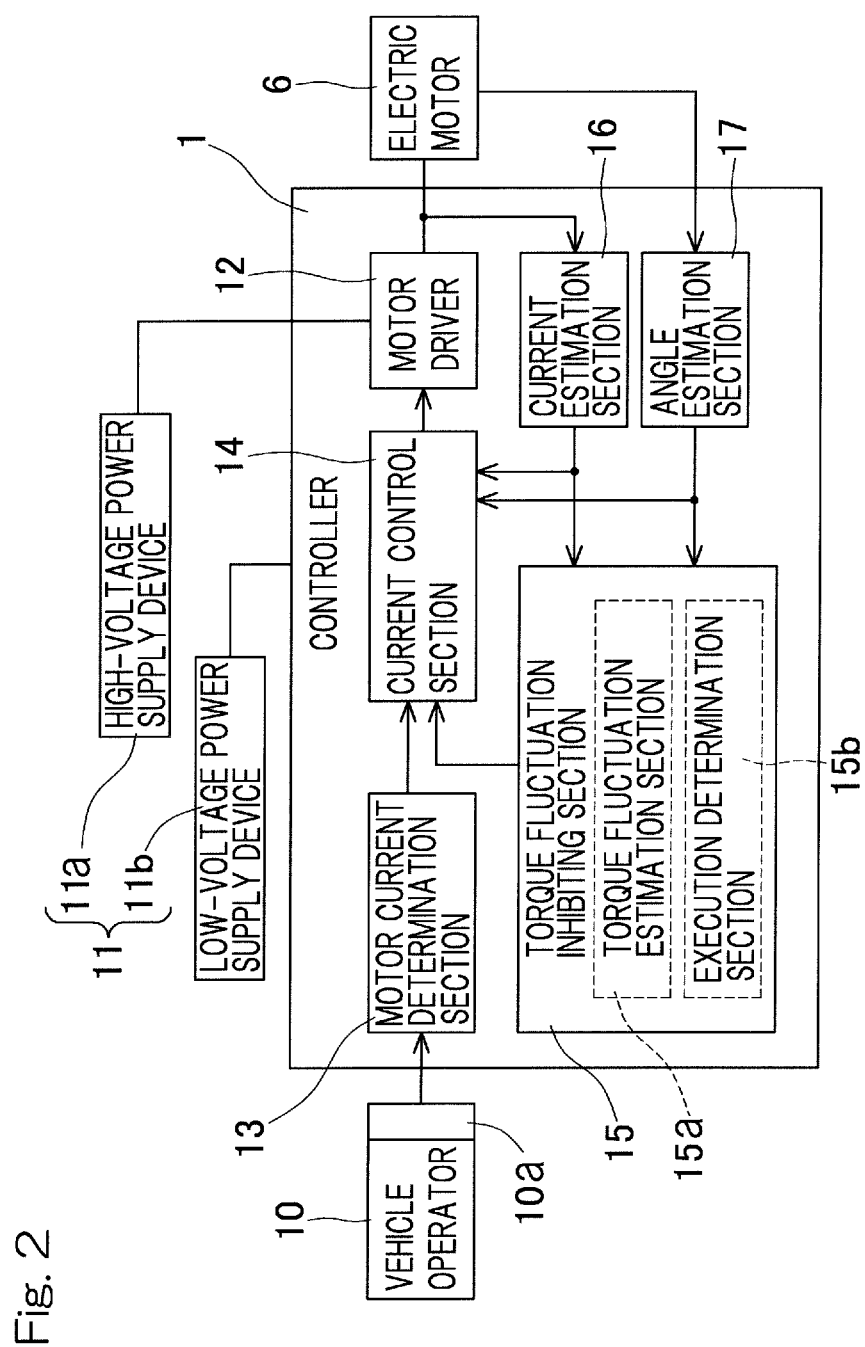
FIG. 2 is a block diagram showing a control system of the motor drive device.

The control system will be described. As shown in FIG. 2, an electric motor device includes the electric motor 6, and the controller 1 for controlling the torque of the electric motor 6. A vehicle equipped with the electric motor device is provided with a vehicle operator 10 that inputs a torque command value, and a power supply device 11. The vehicle operator 10 is, for example, an accelerator pedal in a four-wheeled automobile. The torque command value is inputted to the controller 1, based on an output from a sensor 10a, which varies depending on an operation amount of the accelerator pedal.

The power supply device 11 corresponds to a battery of the vehicle. The power supply device 11 includes a high-voltage power supply device 11a for driving the electric motor 6, and a low-voltage power supply device 11b for causing the controller 1, the sensor, and the like to operate. The high-voltage power supply device 11a is, for example, a battery of about 300 V. As for the low-voltage power supply device 11b, a DC-DC converter that reduces the voltage of the above battery and outputs the reduced voltage, or a battery of 12 V, can be used. The high-voltage power supply device 11a is connected to a motor driver 12 in the controller 1, and supplies a predetermined high-voltage power to the electric motor 6. The low-voltage power supply device 11b is connected to the controller 1 and the like, and supplies a predetermined low-voltage power.

The controller 1 includes a motor current determination section 13, a current control section 14, the motor driver 12, a torque fluctuation inhibiting section 15, a current estimation section 16, and an angle estimation section 17. The motor current determination section 13 determines a target current of the electric motor 6, based on the inputted torque command value and the like. The current control section 14 has the function of controlling an actual motor current by using a motor current estimated by the current estimation section 16 so as to attain the target current provided from the motor current determination section 13. The current control section 14 adopts, for example, feedforward control in which an application voltage to the electric motor 6 is determined based on a model of the electric motor 6. However, as described later, the current control section 14 is not limited to the feedforward control.

The torque fluctuation inhibiting section 15 has the function of inhibiting torque fluctuation of the electric motor 6. The torque fluctuation inhibiting section 15 includes: a torque fluctuation estimation section 15a that generates an estimated value of a torque fluctuation frequency used for cancellation as described with reference to FIG. 3; and an execution determination section 15b that determines whether or not to inhibit torque fluctuation. The torque fluctuation estimation section 15a can generate the estimated value of the torque fluctuation frequency, based on, for example, the relationship between an angular velocity of the electric motor 6 and a torque fluctuation cycle per predetermined rotation angle in the electric motor 6. The motor angular velocity is obtained by, for example, differentiating a motor angle estimated by the angle estimation section 17, or using a state estimation observer or the like based on a physical motion equation or the like.

For example, since the torque fluctuation frequency is proportional to the present motor angular velocity, the torque fluctuation frequency is estimated from the present motor angular velocity. The execution determination section 15b, as described later, estimates influence, on the vehicle, of the torque fluctuation at the estimated torque fluctuation frequency. The execution determination section 15b determines whether or not to inhibit the torque fluctuation in the electric motor 6, based on, for example, a result of comparison between the estimated value of the torque fluctuation frequency in the electric motor 6, and one or both of transmission characteristics of the torque transmitter 3 and vibration characteristics in the vehicle (described later with reference to FIG. 9). Based on the result of this estimation, the execution determination section 15b positively executes torque fluctuation inhibiting control if the influence on the vehicle is great. If the influence on the vehicle is small, the execution determination section 15b negatively executes the torque fluctuation inhibiting control, or does not execute the torque fluctuation inhibiting control.

Based on a control signal provided from the current control section 14, the motor driver 12 converts DC power from the high-voltage power supply device 11a into AC power to be used for driving the electric motor 6. If the motor driver 12 is configured to perform PWM control using, for example, a half-bridge circuit or the like including a switching element such as an IGBT or an FET, the configuration of the motor driver 12 is suitably simplified.

The current estimation section 16 is configured to have, for example, a current sensor provided in a power transmission path from the motor driver 12 to the electric motor 6. The current sensor can obtain the respective currents to be applied to three-phase exciting coils (not shown) in the electric motor 6. In measuring a three-phase current, for example, current may be measured for any two out of the three phases while the remaining one phase may be obtained based on the total sum of the three phases becoming zero. As for the current sensor, for example, a magnetic-field detection type sensor that detects a magnetic field caused by a current, or a voltage measurement type sensor that measures a voltage between opposite ends of a shunt resistor, an IGBT, or the like, can be used. The angle estimation section 17 includes an angle sensor that directly detects the angle of the rotor 6a (FIG. 1), such as a resolver or an encoder. However, the current estimation section 16 and the angle estimation section 17 are not limited to the above configurations.

Figure 3:
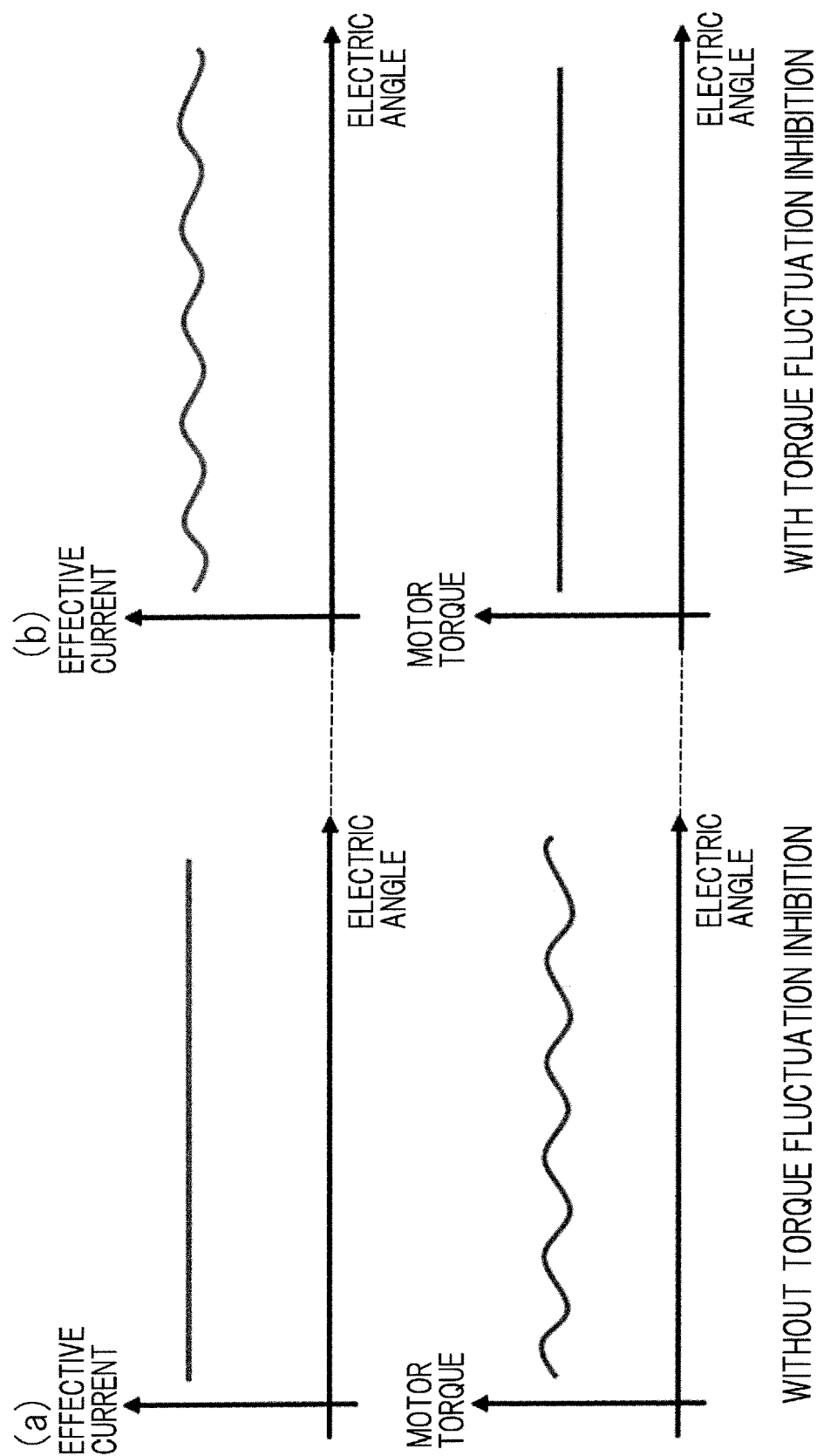
FIG. 3 is a diagram schematically showing an example of inhibition of torque fluctuation in the motor drive device.

FIG. 3 schematically shows an example of inhibition of torque fluctuation. As shown in chart (a) of FIG. 3, when a constant effective current is applied with a predetermined current amplitude and a predetermined phase, a motor torque varies at a predetermined multiple of an electrical angle frequency. Therefore, as shown in chart (b) of FIG. 3, when the torque fluctuation inhibiting section 15 (FIG. 2) causes the effective current to change by a predetermined amount in opposite phase to the phase of torque fluctuation of the motor torque, the motor torque becomes substantially constant.

A waveform of this current for the torque fluctuation inhibition can be generated in advance by, for example, analyzing or actually measuring an amount of torque fluctuation with respect to an electrical angle phase of the electric motor 6 (FIG. 2). Alternatively, for example, torque fluctuation may be detected by using an observer or the like for detecting disturbance torque, based on information such as motor angular velocity and motor current, and the waveform of the current for the torque fluctuation inhibition can be derived based on the detected value. For example, as in the in-wheel motor drive device IWM (FIG. 1) of the present embodiment, when there are a plurality of electric motors 6 (FIG. 1) to be simultaneously driven by the single controller 1 (FIG. 1), the torque fluctuation inhibiting section 15 shown in FIG. 2 generates a current for inhibiting torque fluctuation, as follows.

As described above, current waveforms $i_{\delta 1}$, $i_{\delta 2}$, . . . , $i_{\delta n}$ for inhibiting torque fluctuations of a plurality of (n) electric motors 6 are derived, and a current $i_{\delta all}$ is generated by superimposing these derived current waveforms. When the superimposed torque fluctuation inhibiting current is distributed as $i_{\delta all}/n$ to each of the plurality of (n) electric motors 6, the torque fluctuation inhibiting current can be suitably minimized.

By executing the torque fluctuation inhibition shown in chart (b) of FIG. 3, the torque fluctuation of the electric motor 6 (FIG. 2) can be reduced. On the other hand, there is a possibility that the current for the torque fluctuation inhibition causes a high frequency component to be superimposed on an excitation magnetic flux, mainly leading to an increase in iron loss of a stator core of the electric motor 6 (FIG. 2). Therefore, the execution determination section 15*b* (FIG. 2) in the torque fluctuation inhibiting section 15 (FIG. 2) determines whether or not to execute torque fluctuation inhibiting control as described above.

Figure 4:
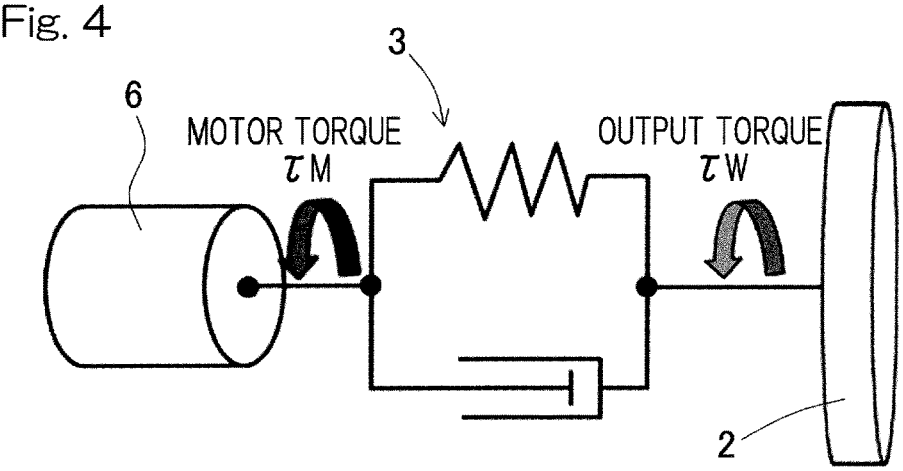
FIG. 4 is a diagram schematically showing torque transmission from an electric motor of the motor drive device to a wheel.

FIG. 4 schematically shows torque transmission from the electric motor 6 of the motor drive device to the wheel 2. FIG. 4 shows a motor torque $\tau_M$ from the electric motor 6 to the torque transmitter 3, and a wheel torque $\tau_W$ from the torque transmitter 3 to the wheel 2. Illustration of the reducer and a differential gear is omitted. The spring rate in the torque transmitter 3 depends mainly on torsion rigidity or the like of the torque transmission system, and the damping rate in the torque transmitter 3 depends on kinematic viscosity coefficient or the like of a bearing or the like.

Figure 5A:
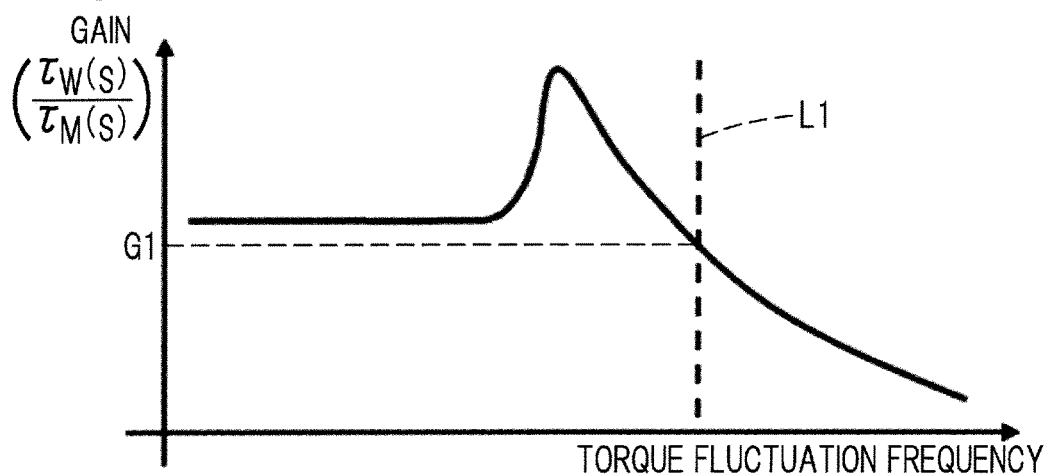
FIG. 5A is a diagram showing an example in which an execution determination section of the motor drive device determines whether or not to inhibit torque fluctuation, based on predetermined characteristics depending on a motor angular velocity.
Figure 5B:
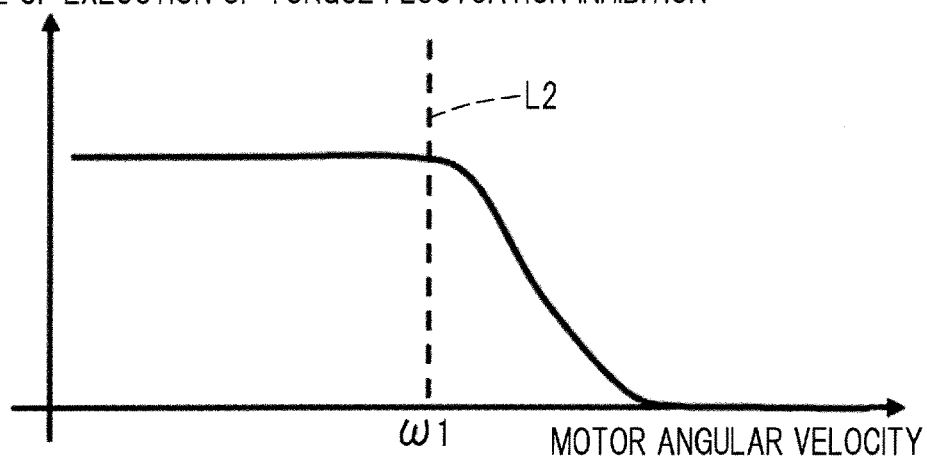
FIG. 5B is a diagram showing an example in which the execution determination section of the motor drive device determines whether or not to inhibit torque fluctuation, based on predetermined characteristics depending on the motor angular velocity.

FIG. 5A shows the transmission characteristics of the torque transmission system shown in FIG. 4, in which the horizontal axis indicates the torque fluctuation frequency. FIG. 5B shows the degree of execution of the torque fluctuation inhibiting function by the execution determination section 15*b* (FIG. 2), which depends on the transmission characteristics. The execution determination section 15*b* (FIG. 2) reduces the degree of execution of the torque fluctuation inhibiting function when both the following conditions a and b are satisfied.

Condition a: A gain in the transmission characteristics falls below a predetermined value G1, which is represented by a broken line L1 in FIG. 5A. The gain represents an amplification factor of the wheel torque $\tau_W(s)$ with respect to the motor torque $\tau_M(s)$ at the same time.

Condition b: A motor angular velocity ω1 represented by a broken line L2 in FIG. 5B has been exceeded, at which torque fluctuation corresponding to a frequency may occur.

L1, G1, L2, and ω1 are determined as appropriate through a test with an actual vehicle, a simulation, or the like.

After the motor angular velocity ω1 at which the conditions a and b are satisfied has been exceeded, even if torque fluctuation occurs, influence of the torque fluctuation on the transmission torque is attenuated based on the characteristics shown in FIG. 5A. Therefore, even if the process of reducing the degree of execution of the torque fluctuation inhibiting function is performed, this process is less likely to adversely affect the behavior of the vehicle. A function for reducing the degree of execution of the torque fluctuation inhibiting operation or function may be a smooth curve as shown in FIG. 5B, or a waveform obtained by connecting a plurality of straight lines, or a stepwise waveform that is switched between ON and OFF in a binary manner at the boundary of a certain angular velocity.

Figure 6:
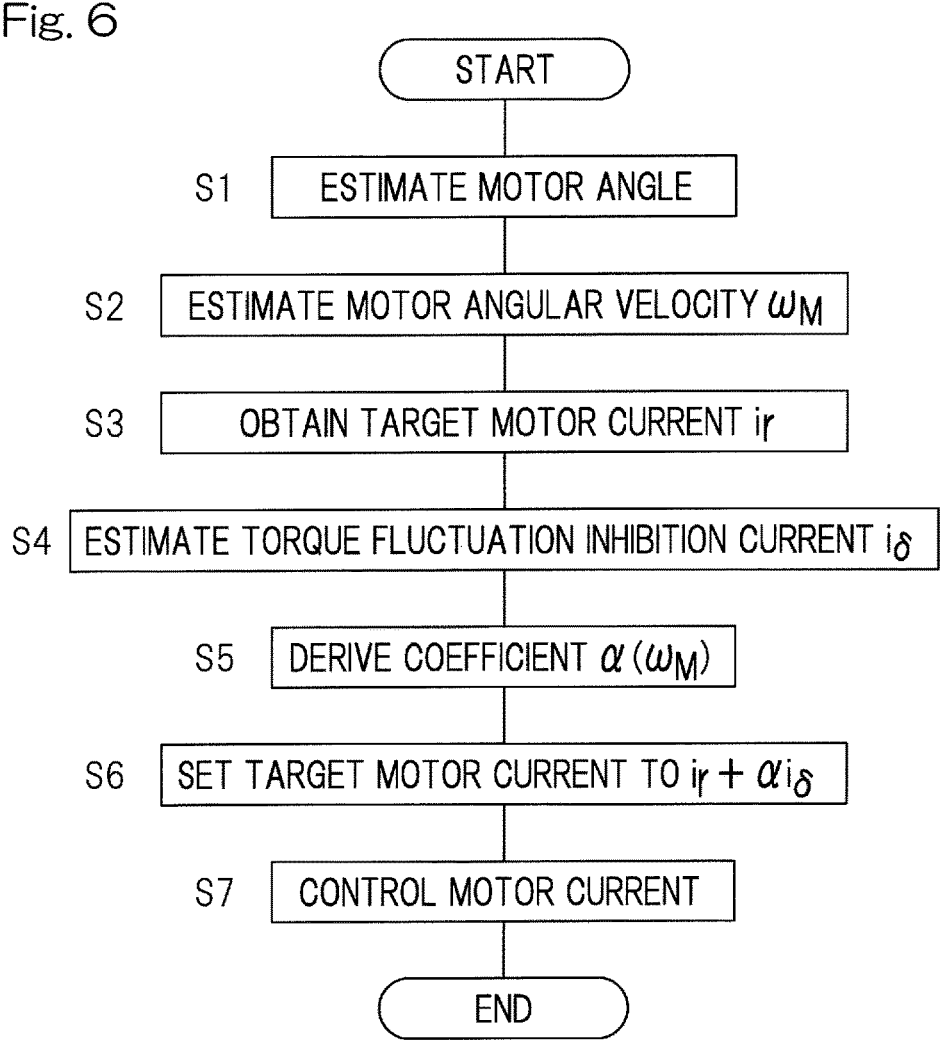
FIG. 6 is a flowchart of the motor drive device executing a torque fluctuation inhibiting function.

FIG. 6 is a flowchart of the motor drive device executing the torque fluctuation inhibiting function. FIG. 2 is also referred to. For example, this process is started on the condition that a main power supply of a vehicle is turned on, and the angle estimation section 17 estimates a motor angle (step S1). Next, the torque fluctuation estimation section 15*a* estimates a motor angular velocity $\omega_M$ from the estimated motor angle (step S2). Next, the torque fluctuation estimation section 15*a* obtains a target motor current $i_r$ from the motor current determination section 13 (step S3).

Next, the torque fluctuation inhibiting section 15 estimates a torque fluctuation inhibiting current $i_\delta$, based on the motor angular velocity $\omega_M$ and the target motor current $i_r$ (step S4). Thereafter, the execution determination section 15*b* derives a coefficient α ($\omega_M$) that is a torque fluctuation inhibiting degree with respect to the motor angular velocity $\omega_M$ (step S5).

Figure 7:
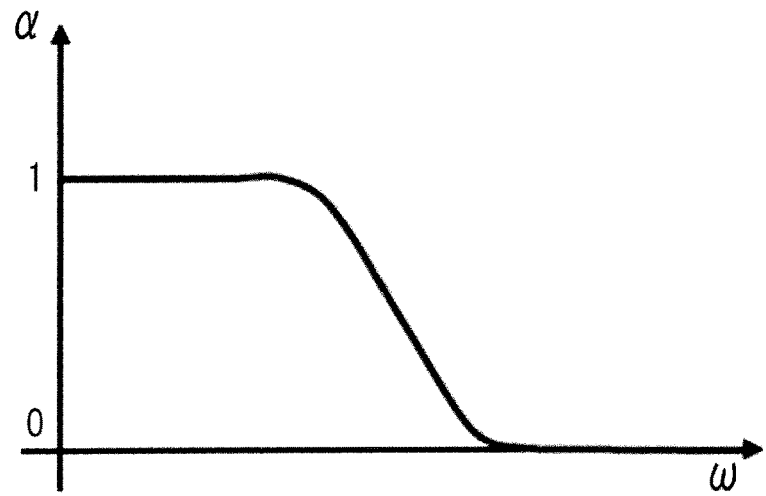
FIG. 7 is a diagram showing an example of setting of a function of a coefficient α in FIG. 6.

FIG. 7 shows an example of setting of a function of the coefficient α in FIG. 6. As shown in FIG. 7, for example, under the condition that the absolute value of the motor angular velocity is lower than or equal to a predetermined motor angular velocity, the coefficient α that is an amount of operation to inhibit torque fluctuation is set to "1", whereby the degree of execution of the torque fluctuation inhibiting function is exerted at maximum. Under the condition that the absolute value of the motor angular velocity exceeds the predetermined motor angular velocity, the coefficient α is gradually reduced from "1" with an increase in the motor angular velocity, so as to be set to a function that reduces the degree of execution of the torque fluctuation inhibiting function. Further, under the condition that the absolute value of the motor angular velocity is higher than or equal to a given motor angular velocity, the coefficient α is set to "0". When the coefficient α is set to "0", the torque fluctuation inhibiting control is not executed. The predetermined motor angular velocity and the given motor angular velocity are obtained based on the result of one or both of a test and a simulation.

As shown in FIG. 6 and FIG. 2, after step S5, the current control section 14 sets, as a target motor current, a value $(i_r + \alpha i_\delta)$ obtained by adding the obtained target motor current $i_r$ to a value obtained by multiplying the torque fluctuation inhibiting current $i_\delta$ by the coefficient α (step S6). The electric motor 6 is controlled based on the set target motor current (quantity of state corresponding to the motor torque) (step S7). Thereafter, this process is ended.

Each of the motor current determination section 13, the current control section 14, the torque fluctuation estimation section 15*a*, and the execution determination section 15*b* is configured from a hardware circuit or a software function on a processor (not shown), that is capable of performing calculation and outputting a result thereof, by using, specifically, an LUT (Look Up Table) realized by software or hardware; a predetermined conversion function stored in a library of software, or hardware equivalent thereto; or, according to need, a comparison function or an arithmetical operation function in a library, or hardware equivalent thereto.

According to the motor drive device described above, the torque fluctuation is inhibited at a torque fluctuation frequency in a low frequency region where the gain of the transmission characteristics is high, thereby improving noise, vibration, and harshness, and enhancing riding comfort. At a torque fluctuation frequency in a high frequency region where the gain of the transmission characteristics is low, negative inhibition of torque fluctuation is executed or inhibition of torque fluctuation is not executed. Thus, iron loss can be prevented from increasing. Since an increase in iron loss can be prevented, fuel efficiency and power efficiency of the vehicle can be enhanced, and heat generation in the electric motor 6 can be inhibited. Further, since the torque fluctuation that causes a problem in the behavior of the vehicle is compensated for by control, requirements in motor design are relaxed, thereby realizing cost reduction and space conservation.

Figure 8:
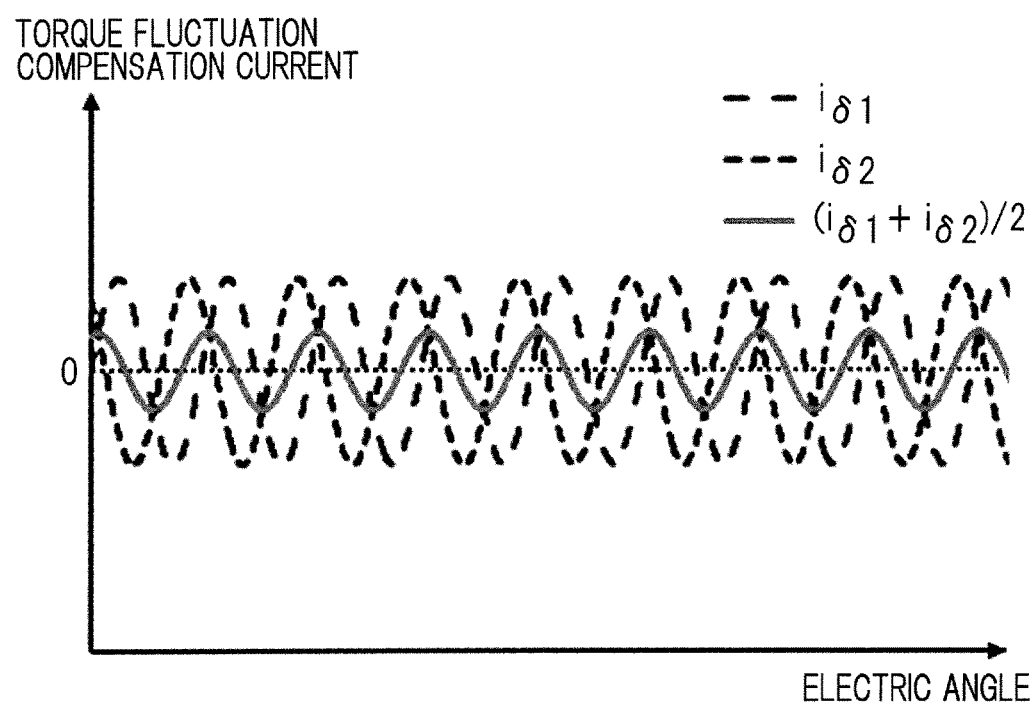
FIG. 8 is a diagram showing an example of torque fluctuation compensation in a motor drive device that drives a plurality of electric motors, according to another embodiment of the present invention.

Another embodiment will be described. FIG. 8 shows an example of torque fluctuation compensation in a motor drive device for driving a plurality of (in this embodiment, two) electric motors. In FIG. 8, the horizontal axis indicates the electrical angle of each electric motor, and the vertical axis indicates torque fluctuation compensation current. The torque fluctuation inhibiting section 15 (FIG. 2) can calculate the torque fluctuation compensation currents of the first and second electric motors, as follows.

First, the torque fluctuation compensation current $i_{\delta1}$ of the first electric motor and the torque fluctuation compensation current $i_{\delta2}$ of the second electric motor are calculated. Next, the torque fluctuation compensation current $i_{\delta2}$ of the second electric motor is added to the torque fluctuation compensation current $i_{\delta1}$ of the first electric motor, and the sum thereof is divided by the number of the motors, i.e., "2", to obtain an average value $\{(i_{\delta1}+i_{\delta2})/2\}$. This average value $\{(i_{\delta1}+i_{\delta2})/2\}$ finally becomes the torque fluctuation compensation current of each of the first electric motor and the second electric motor. According to this configuration, there are cases where the torque fluctuation compensation currents of the plurality of the electric motors can be reduced, and an increase in iron loss can be inhibited. For example, when the first electric motor and the second electric motor have 180° shifted electrical angle phases regarding torque fluctuation, the torque fluctuation compensation currents are zero, resulting in the maximum effect.

Figure 9A:
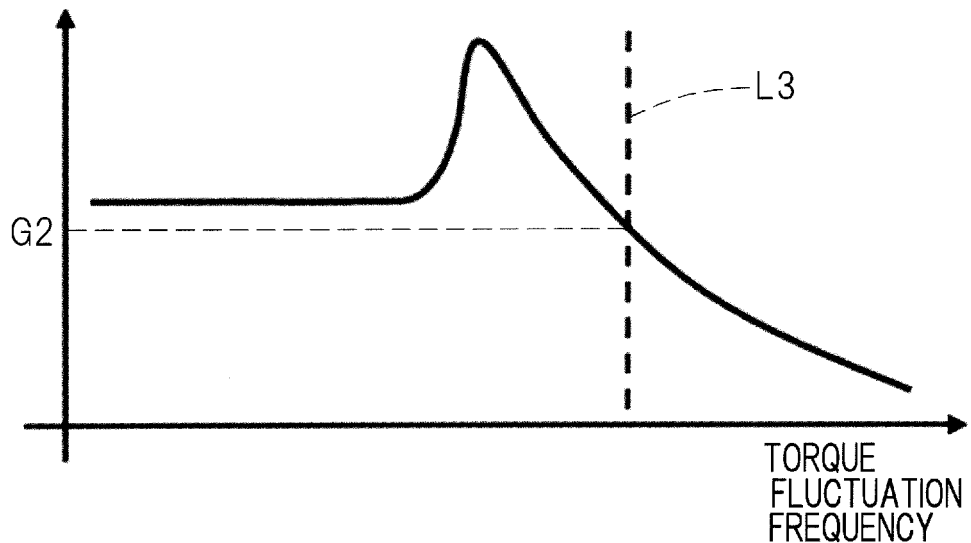
FIG. 9A is a diagram showing an example in which an execution determination section of a motor drive device determines whether or not to inhibit torque fluctuation, based on predetermined characteristics depending on a motor angular velocity, according to the other embodiment of the present invention.

FIG. 5A is used for describing an example of determination of the execution determination section, based on the transmission characteristics of the torque transmission system. However, a process similar to FIG. 5A may be executed based on the characteristics of on-spring vibration with respect to torque fluctuation of the wheel, instead of the torque transmission characteristics. In this case, as shown in FIG. 9A, the amplification factor (gain) of the vibration characteristics of the on-spring vibration with respect to the wheel torque fluctuation can be set as the vertical axis, and the torque fluctuation frequency can be set as the horizontal axis. This method may be used in combination with the aforementioned method.

Figure 9B:
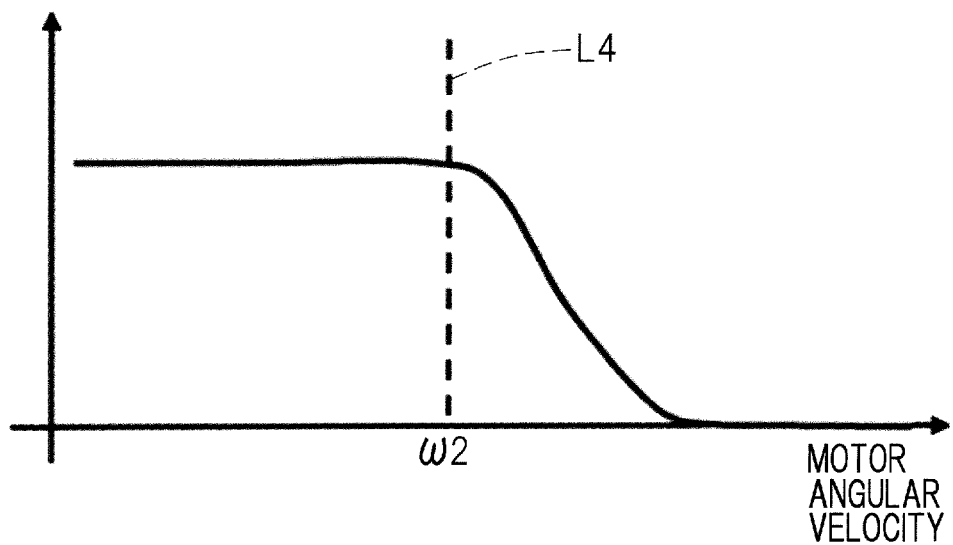
FIG. 9B is a diagram showing an example in which the execution determination section of the motor drive device determines whether or not to inhibit torque fluctuation, based on predetermined characteristics depending on the motor angular velocity, according to the other embodiment of the present invention.

In the state where the gain in the vibration characteristics falls below a predetermined value G2, which is indicated by a broken line L3 in FIG. 9A, after the absolute value of the motor angular velocity has exceeded the motor angular velocity ω2 indicated by a broken line L4 in FIG. 9B, the execution determination section 15b (FIG. 2) can reduce the degree of execution of the torque fluctuation inhibiting function. L3, G2, L4, and ω2 are determined as appropriate through a test with an actual vehicle, a simulation, or the like. The aforementioned example of determination based on the transmission characteristics of the torque transmission system and the example of determination based on the vibration characteristics may be used in combination.

As for the electric motor 6, a so-called SPM motor obtained by providing a permanent magnet on an outer peripheral surface of the core of a rotor may be used. Alternatively, an induction motor may be used as the electric motor 6. The motor current determination section 13 may, for example, adopt a method in which predetermined current amplitude and phase or d-axis current and q-axis current are referred to, on a predetermined table, based on the requested torque command value and the present motor angular velocity.

The current control section 14 may adopt, instead of the feedforward control, for example, feedback control in which a voltage to be applied to the electric motor 6 is determined based on at least one of the estimated value of the motor current and the estimated value of the motor angular velocity. The current control section 14 may adopt feedback control in which a voltage to be applied to the electric motor 6 is determined based on the estimated value of at least one of the motor current and the motor angular velocity, and a difference between the estimated value and the target value. The current control section 14 may adopt the aforementioned feedforward control in combination with either one of the aforementioned feedback controls. Alternatively, the current control section 14 may adopt, for example, a method based on empirical rule, such as fuzzy control.

The torque fluctuation estimation section 15a may have the function of, for example, obtaining torque fluctuation at a predetermined motor current through a simulation or the like, and superimposing, on a target current, a current that causes a torque that cancels the torque fluctuation. In this case, a reduction in calculation load of the controller 1 can be achieved. The torque fluctuation estimation section 15a may use, for example, an observer that detects torque fluctuation from the estimated value of one or both of the motor current and the motor angular velocity. In this case, influence such as a model error can be reduced. The method using this observer or the like may be used in combination with the method of superimposing, on the target current, the current that causes the torque that cancels the torque fluctuation, as appropriate.

The current estimation section 16 may be configured to have, for example, a current sensor provided in a bus bar or the like inside an electric motor. Alternatively, the current estimation section 16 may have, for example, a current sensor provided in a power transmission path from the high-voltage power supply device 11a to the motor driver 12, and may estimate the motor current by using one or both of the applied voltage and the motor angle estimated by the angle estimation section 17. The angle estimation section 17 may adopt, for example, a method of estimating the motor angle in a sensorless manner from a voltage or current at a motor terminal.

The vehicle operator 10 may be configured to generate, for example, an acceleration command or a speed command for the vehicle. Alternatively, a controller for controlling the acceleration command and the speed command may be additionally provided. The power supply device 11 may be configured such that a DC-DC converter is provided in the controller 1, and the motor driver 12 is connected to only the high-voltage power supply device 11*a*.

In the in-wheel motor drive device IWM, a cycloidal reducer, a planetary reducer, a biaxial parallel reducer, or other reducers can be used. The in-wheel motor drive device IWM may be of a so-called direct motor type adopting no reducer. The motor drive device of the present invention is not limited to the in-wheel motor drive device, and may be of an on-board type having an electric motor device mounted on a vehicle body.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

1 . . . controller
2 . . . wheel
3 . . . torque transmitter
6 . . . electric motor
15 . . . torque fluctuation inhibiting section
15*a* . . . torque fluctuation estimation section
15*b* . . . execution determination section

What is claimed is:

1. A motor drive device comprising:
an electric motor;
a controller configured to control a torque of the electric motor, or a quantity of state corresponding to the torque; and
a torque transmitter configured to transmit the torque of the electric motor to a wheel of a vehicle, wherein
the controller includes a torque fluctuation inhibiting section configured to inhibit torque fluctuation in the electric motor, and
the torque fluctuation inhibiting section includes an execution determination section configured to determine whether or not to inhibit the torque fluctuation in the electric motor, based on a result of comparison between an estimated value of a torque fluctuation frequency in the electric motor, and one or both of transmission characteristics of the torque transmitter and vibration characteristics in the vehicle.

2. The motor drive device as claimed in claim 1, wherein the torque fluctuation inhibiting section includes a torque fluctuation estimation section configured to generate the estimated value of the torque fluctuation frequency, based on a relationship between an angular velocity of the electric motor and a torque fluctuation cycle per a predetermined rotation angle in the electric motor.

3. The motor drive device as claimed in claim 2, wherein the execution determination section reduces an amount of operation to inhibit the torque fluctuation in the electric motor, with an increase in an absolute value of the angular velocity of the electric motor, under a condition that the absolute value of the angular velocity exceeds a predetermined value.

4. The motor drive device as claimed in claim 3, wherein
the angular velocity of the electric motor at which the execution determination section reduces the amount of operation to inhibit the torque fluctuation is an electric motor angular velocity at which an amplification factor falls below a predetermined value, and
the amplification factor is an amplification factor of transmission characteristics of an output torque with respect to an input torque to the torque transmitter, in the estimated value of the torque fluctuation frequency or a quantity of state corresponding to the estimated value.

5. The motor drive device as claimed in claim 3, wherein
the angular velocity of the electric motor at which the execution determination section reduces the amount of operation to inhibit the torque fluctuation is an electric motor angular velocity at which an amplification factor falls below a predetermined value, and
the amplification factor is an amplification factor of vibration characteristics in the vehicle, in the estimated value of the torque fluctuation frequency or a quantity of state corresponding to the estimated value.

* * * * *